United States Patent [19]

Ishii et al.

[11] Patent Number: 5,093,730
[45] Date of Patent: Mar. 3, 1992

[54] PRINTER FOR PRINTING VIDEO IMAGE

[75] Inventors: Kazuo Ishii, Kanagawa; Kazuya Umeyama; Tetsuya Kohno, both of Tokyo, all of Japan

[73] Assignee: Sony Corporation, Tokyo, Japan

[21] Appl. No.: 616,414

[22] Filed: Nov. 21, 1990

[30] Foreign Application Priority Data

Nov. 22, 1989 [JP] Japan .................................. 1-304210
Nov. 25, 1989 [JP] Japan .................................. 1-305167
Nov. 25, 1989 [JP] Japan .................................. 1-305171

[51] Int. Cl.$^5$ ..................... H04N 1/17; H04N 1/21; H04N 1/23; H04N 1/387
[52] U.S. Cl. ................................. 358/296; 358/444; 358/445; 358/449; 358/451
[58] Field of Search ............... 358/296, 401, 445, 451, 358/448, 449, 909, 140, 160, 406, 404, 444, 443; 382/47

[56] References Cited

U.S. PATENT DOCUMENTS

| 4,346,397 | 8/1982 | Ota | 358/140 |
| 4,734,785 | 3/1988 | Takei | 358/451 |
| 4,843,471 | 6/1989 | Yazawa | 358/160 |
| 4,851,922 | 7/1989 | Takayama | 358/451 |

Primary Examiner—Benjamin R. Fuller
Assistant Examiner—Scott A. Rogers
Attorney, Agent, or Firm—Hill, Van Santen, Steadman & Simpson

[57] ABSTRACT

A printer for printing video image having control circuits which are composed of a circuit for measuring a horizontal scanning frequency and the number of scanning lines of an input video signal, a circuit for calculating a sampling frequency of the video signal on the basis of the measured horizontal scanning frequency, and a circuit for calculating a moving pitch of a printing element for printing the video signal on the basis of the number of the scanning lines, wherein a printing range corresponding to the video signal is automatically determined by an output signal of the control circuits.

4 Claims, 12 Drawing Sheets

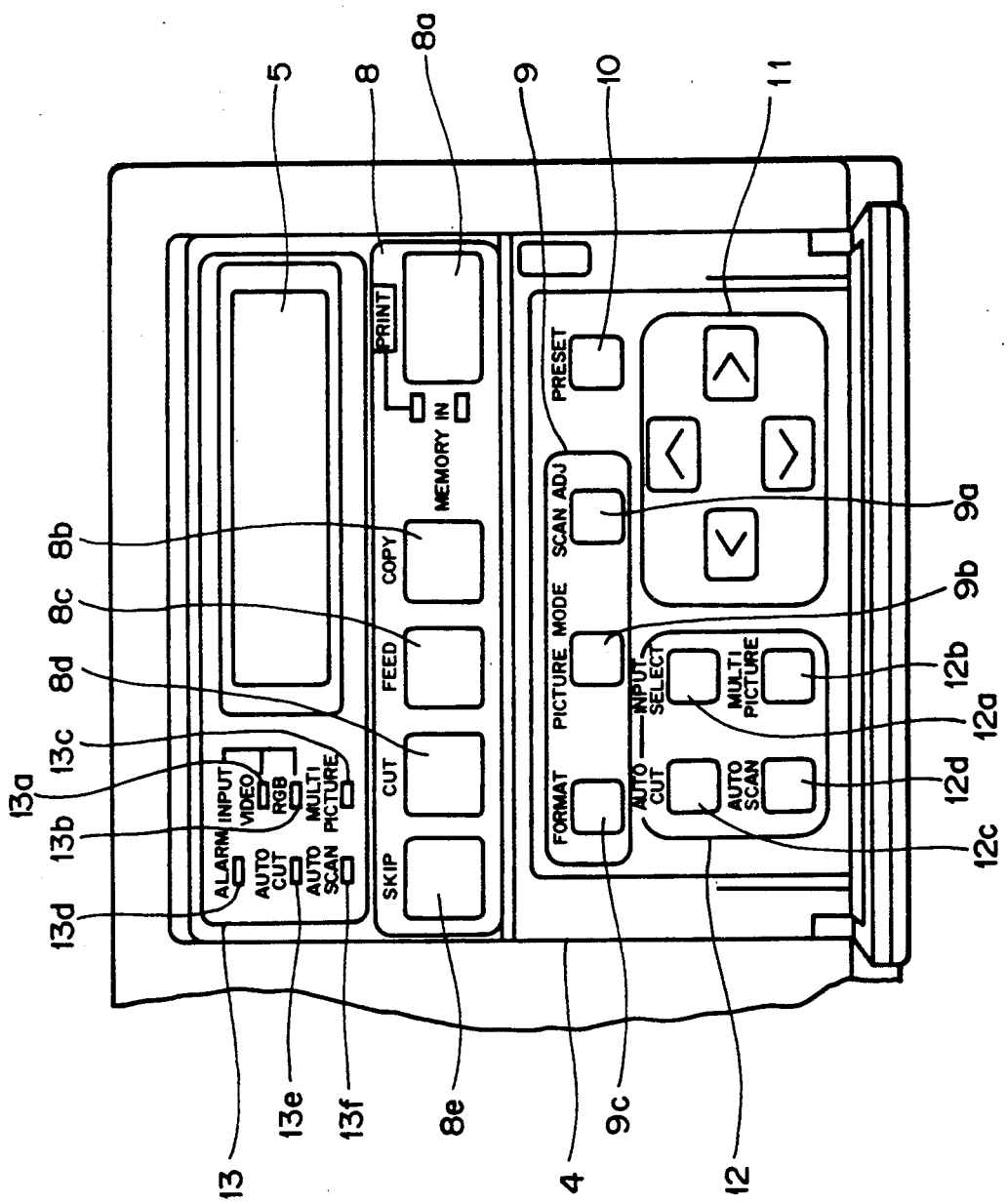

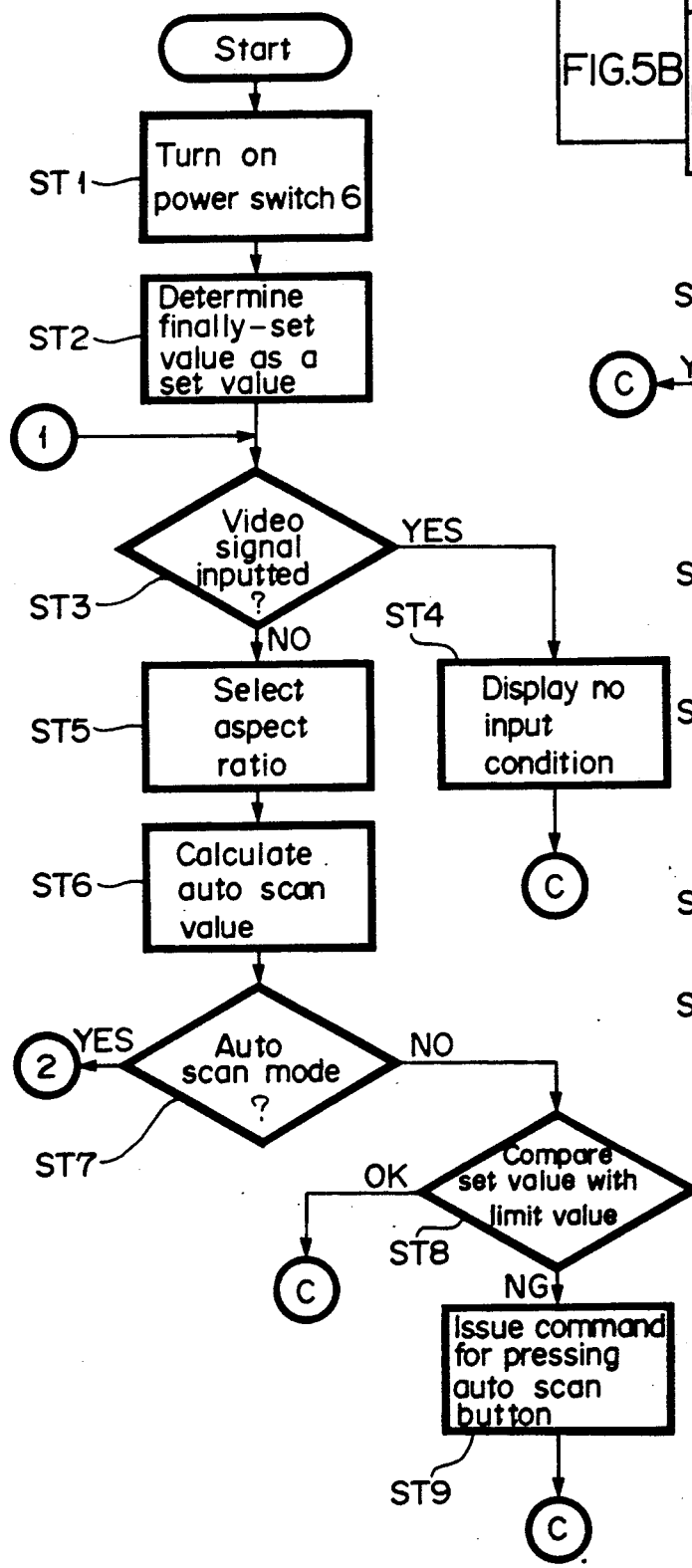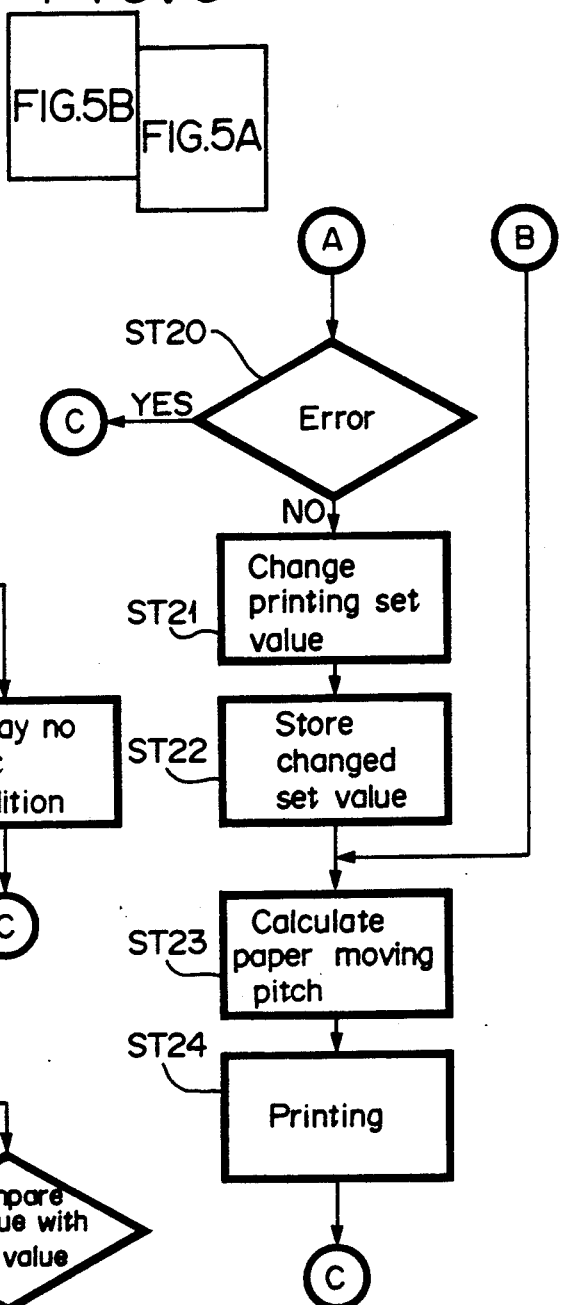
FIG. 5A
FIG. 5

FIG. 10

| Display on LCD 5 | | Number of Images Stored in memory |
|---|---|---|
| Signal Picture Mode | Multi Picture Mode | |
| 33 — READY  ■1 | — | 1 |
| 34 — READY  ■1<br>         2 | READY  ■2<br>         3 4 | 2 |
| 35 — READY  1<br>         ■2↓ | READY  1 2<br>         ■4 | 4 |
| — | READY  1 2<br>         3■↓ | 8 |

37

PRINTER FOR PRINTING VIDEO IMAGE

BACKGROUND OF THE INVENTION

1 Field of the Invention

The present invention generally relates to printers for printing a video image and, more particularly, is directed to a printer which is suitably applied to a multi-scan video printer for printing video input signals of different kinds.

2. Description of the Prior Art

A multi-scan video printer is proposed in the art, in which different kinds of input signals, for example, an NTSC video input signal and a video input signal from a personal computer are inputted to one printing apparatus and video images corresponding to these video input signals can be printed on a recording paper by a thermal print head or the like.

The multi-scan video printer is supplied with an input signal having scanning lines and horizontal scanning frequency considerably different from scanning lines, horizontal scanning frequency and aspect ratio or the like of a television video signal when video images of various living bodies for medical use are printed out.

When the scanning lines and horizontal scanning frequency of the video input signals supplied to the multi-scan video printer are changed as described above, various values of the following items must be manually determined in the conventional multi-scan video printer:

(1) Value of the printing area in the horizontal direction of a memory within the multi-scan video printer;

(2) Value of the printing area in the vertical direction of the memory within the multi-scan video printer;

(3) Number of sampling dots, i.e. sampling frequency; within one horizontal period;

(4) Value of printing size in the horizontal direction to be printed (dimension of lateral direction of printing); and (5) Value of printing size in the vertical direction to be printed (dimension of longitudinal direction of printing).

The above-described values of various kinds cannot be inputted to the multi-scan video printer by those who have insufficient understanding of video signals inputted to the multi-scan video printer.

Incidentally, in the aforenoted multi-scan video printer, a storage capacity of a memory is determined so that a television signal of the system in which an input video signal has much more horizontal scanning lines can be stored therein.

The storage capacity of the memory in the multi-scan video printer is determined constant. For example, assuming that the storage capacity of the memory is determined to store therein data of $1024 \times 1024$ bits, then an input video signal of 1024 dots $\times 500$ lines is stored in the memory of such multi-scan video printer and the input video signal stored therein is read out. However, upon printing, only one sheet of video image of the input video signal can be printed. More specifically, from a memory storage capacity standpoint, if the input video signal of 1024 dots $\times 500$ lines is inputted to the memory of the above-described storage capacity, this multi-scan video printer could print two sheets of video image of such input video signal but can print only one sheet of video image, thus making the storage capacity of one picture amount useless.

Furthermore, if video signals inputted to the multi-scan video printer are different, then video images of different dimensions are printed out. The condition that video images are printed out in different sizes will be described with reference to FIGS. 1A–1C.

Let us consider a television picture 32 shown in FIG. 1A. In that case, let us assume that a horizontal scanning line number l in the vertical direction V is 525 and that its dot number in the horizontal scanning direction H is a dots, for example, 1500 dots. Also, let it be assumed that an effective dot number in the line direction of a thermal print head 20 is 1216 dots as shown in FIG. 1B and that the television picture 32 long in the width direction shown in FIG. 1A is stored in the memory under this condition. Further, let it be assumed that the printing is performed under the condition that the longitudinal direction (i.e. direction of a dots) of the television picture 32 is matched with the longitudinal direction of the printing paper 21 as shown in FIG. 1B and that, for example, the horizontal scanning line l in the vertical direction and the dot number of the thermal print head 20 in the horizontal scanning line direction are made corresponding to each other as 1 : 1. Then, $l=525$ lines correspond to $l=525$ dots so that the television picture 32 is generally printed as shown in FIG. 1B, thus the television picture 32 being printed out small because l is equal to 525 dots as compared with the effective dot number of the thermal print head 20 presented as $h=1216$ dots. The a dots in the printing paper moving direction are determined by the printing paper moving pitch and the printing is carried out under the condition that the pitch of one dot of a dots, i.e. 1/1500 dot is made corresponding to the aspect ratio of the television picture 32. If the number of horizontal scanning lines in the vertical direction of the input video signal inputted to the printer becomes different as described above, the television picture is printed out in different printing size.

Further, if a television picture long in the width direction similarly to the television picture 32 shown in FIG. 1A is printed on the printing paper 21 as shown in FIG. 1C, the dot number a in the horizontal direction is not always made constant due to analog-to-digital (A/D) conversion in the printer and the restriction of upper limit of the sampling frequency of the memory or the like. As a result, there is the substantial disadvantage that the printing size is changed in accordance with a plurality of different input video signals.

In the aforenoted multi-scan video printer in which the video image is always printed out in the same size of longitudinal and lateral directions, there is the problem that the video image cannot be printed out in size corresponding to the aspect ratio of television pictures of different video input signals.

Furthermore, in a video printer in which the printing size is enlarged by the double printing, it must be determined by the manual operation whether or not the video image is printed out in an enlarged scale. Therefore, if the user does not fully understand the features of a plurality of different video input signals inputted to the multi-scan video printer, the printing size cannot be determined precisely, thus making it impossible to operate an enlarging button of the multi-scan video printer.

OBJECTS AND SUMMARY OF THE INVENTION

Accordingly, it is an object of the present invention to provide an improved printer for printing video image in which the aforenoted shortcomings and disadvantages encountered with the prior art can be substantially eliminated.

More specifically, it is an object of the present invention to provide a printer for printing video image in which an optimum printing can be automatically carried out within the printer in response to an input video signal regardless of different number of scanning lines and different horizontal scanning frequencies of the input signals to the printer.

It is another object of the present invention to provide a printer for printing video image in which, even when the number of scanning lines and horizontal scanning frequencies of input signals fed to an image processing apparatus are different, the number of video images which can be stored in a memory can be automatically calculated from the storage capacity of the memory provided within the image processing apparatus and can be displayed if necessary so that the memory can be utilized effectively.

It is a further object of the present invention to provide a printer for printing video image in which, even when the number of scanning lines and horizontal scanning frequency of input signals fed to the printing apparatus are different, the printing size can be substantially made constant automatically within the printer in response to the input video signal.

It is yet a further object of the present invention to provide a printer for printing video image in which optimum printing corresponding to an aspect ratio of an input television picture can be carried out.

According to a first aspect of the present invention, a printer for printing video image is comprised of control circuits which are composed of a circuit for measuring a horizontal scanning frequency and the number of scanning lines of an input video signal, a circuit for calculating a sampling frequency of the video signal on the basis of the measured horizontal scanning frequency, and a circuit for calculating a moving pitch of a printing element for printing the video signal on the basis of the number of the scanning lines, wherein a printing range corresponding to the video signal is automatically determined by output signals of the control circuits. Therefore, the multi-scan printer is placed in the multi-scan mode only by selecting the auto scan operation button, whereby the number of scanning lines and the horizontal scanning frequency of the input video signal are measured in response to a plurality of different input video signals inputted to the printer and optimum aspect ratio to be printed is determined, thereby the printing being carried out automatically.

As a second aspect of the present invention, a printer for printing video image is comprised of control circuits which are composed of a circuit for measuring a horizontal scanning frequency and the number of scanning lines of an input video signal, a circuit for measuring an amount of information of one picture of the video signal on the basis of the horizontal scanning frequency and the number of scanning lines measured by the circuit for measuring the number of scanning lines, and a circuit for comparing the information amount with a storage capacity of a memory in which the video signal is stored, wherein the number of pictures which can be stored in the memory is automatically determined on the basis of a compared result of the control circuits. Therefore, only by selecting the auto scan operation button, the number of pictures stored in the memory can be calculated from the storage capacity of the memory in response to a plurality of input video signals stored in the memory within the printer and determined or displayed if necessary, thereby the memory being effectively utilized.

In accordance with a third aspect of the present invention, a printer for printing video image is comprised of a circuit for measuring a horizontal scanning frequency and the number of scanning lines of an input video signal, a printing device having a plurality of printing elements aligned for printing the video signal, a circuit for detecting the number of pixels of one line of the video signal generated in response to the line of the printing element on the basis of the horizontal scanning frequency or the number of the scanning lines, a circuit for comparing the number of pixels with the number of printing elements, and a processing circuit for processing the number of the pixels so as to be matched with the number of the printing elements on the basis of the compared result of the comparing circuit. Therefore, only by selecting the auto scan operation button, the printer is placed in the multi-scan mode, whereby the number of scanning lines and the horizontal scanning frequency of the input video signal are measured in response to a plurality of different input video signals input to the printer and the printing size is automatically made substantially constant on the basis of the measured value, thereby the optimum printing corresponding to the aspect ratio of the input television picture being carried out.

The preceding, and other objects, features and advantages of the present invention will be apparent in the following detailed description of the preferred embodiment to be taken in conjunction with the accompanying drawings, in which like references are used to identify the same or similar parts in the several views.

BRIEF DESCRIPTION OF THE DRAWINGS

FIG. 4 is a front view illustrating a button operation portion of the printer of this invention in an enlarged scale;

FIG. 10 is a schematic diagram used to explain displayed conditions of a liquid crystal display device of the printer of this invention;

DETAILED DESCRIPTION OF THE PREFERRED EMBODIMENT

An embodiment of the printer for printing video image according to the present invention will now be described with reference to FIGS. 2 to 12. In order to understand the present invention more clearly, let us explain an overall arrangement of a panel of this printer with reference to FIGS. 3 and 4 prior to the explanation of FIG. 2.

Figure 3:
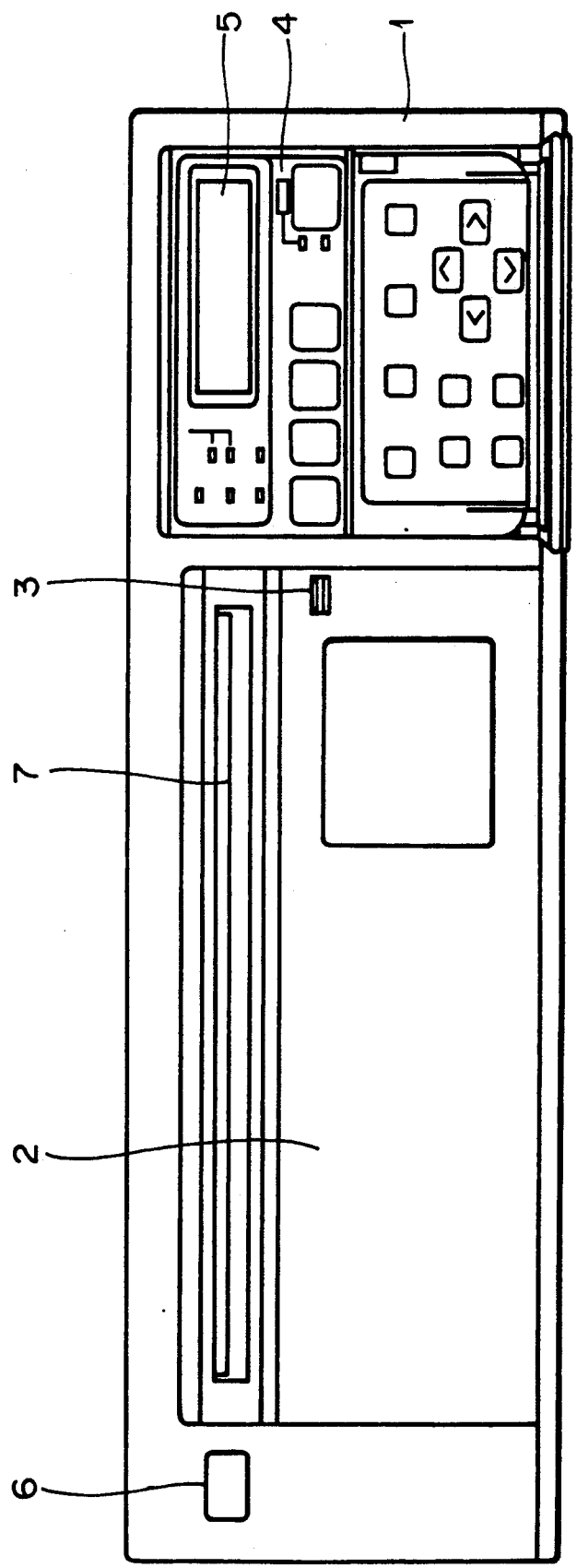
FIG. 3 is a front view illustrating a front panel of the printer of the present invention.

FIG. 3 shows a front view of the panel of this printer according to this embodiment. In FIG. 3, reference numeral 1 designates a panel of a housing of a printing apparatus (will be referred to hereinafter as a multi-scan video printer), and 2 a lid through which a printing paper on which nothing is recorded is inserted. This lid 2 is opened by depressing a push button 3. Reference numeral 4 designates a control panel on which there are provided a liquid crystal display device (LCD) 5 and various operation buttons as will be described later with reference to FIG. 4. Reference numeral 6 designates a power switch which turns on and off the power by its depression. Reference numeral 7 designates an eject mouth from which printed papers are ejected.

Various operation buttons on the control panel 4 will be described with reference to its enlarged front view forming FIG. 4. The LCD 5 displays thereon an operation state and menu of various items by the depression of a print adjust button group 9 and a preset button 10. A printer operation button group 8 includes a print button 8a, a copy button 8b, a feed button 8c, a cut button 8d and a skip button 8e. The print button 8a is served also as a memory-in button which latches an input video signal in the memory. If this print button 8a is depressed, in the single picture mode (mode in which one video image is printed on one printing paper), the video image of input video signal is stored in the memory and the printed input video signal image is obtained. While, in the multi-picture mode (mode in which a plurality of video images are printed on one printing paper), the input video signal is stored in the memory. If the copy button 8b is depressed, the same printed printing paper can be obtained in the single picture mode. While, in the multi-picture mode, the plurality of input video signals stored in the memory are printed out. If the feed button 8c is depressed, then the printing is stopped and the printing paper is ejected from the eject mouth 7 and the printing paper is cut by depressing the cut button 8d. If the skip button 8e is depressed, then one pointer at the memory position can be moved.

The print adjust button group 9 is used to adjust or to determine a predetermined item in various printing modes displayed on the LCD 5. The print adjust button group 9 includes a scan adjust button 9a, a picture mode button 9b and a format button 9c. Functions of these buttons will be described later.

If the preset button 10 is depressed, then values selected in the picture mode (mode presented by depression of the picture mode button 9b) and in the scan mode (mode presented by depression of the scan adjust button 9a) are saved and the thus saved values are loaded to the multi-scan video printer.

A cursor button 11 is used to select the values of items displayed by operating the preset adjust button group 9 and the preset button 10.

In FIG. 4, reference numeral 12 designates a mode select button group, and this mode select button group 12 includes an input select button 12a, a multi-picture button 12b, an auto-cut button 12c and an auto-scan button 12d. If the input select button 12a is depressed, then input signals such as a composite video signal or R (red), G (green) and B (blue) video signals and so on are selected. If the multi-picture button 12b is depressed, then the multi-picture mode is turned "ON" or "OFF". If the auto-cut button 12c is depressed, the auto-cut mode is turned "ON" or "OFF". If the auto-scan button 12d is depressed, the auto-scan mode is turned "ON" or "OFF".

Reference numeral 13 designates a mode indicator group in which various light emitting diodes (LEDs) are flashed. If the input select button 12a is depressed to select the composite video signal, an input video LED 13a is lit. If the R, G and B video signals are selected, an LED 13b for input R, G and B video signals is lit. In a like manner, if the multi-picture button 12b is depressed, a multi-picture LED 13c is lit. If an error is detected within the multi-scan video printer, an alarm LED 13d is lit. If the auto-cut button 12c is selected, an auto-cut LED 13e is lit and if the auto-scan button 12d is selected, an auto-scan LED 13f is lit.

In the above-described arrangement, if the printing, i.e. printing-out is carried out, fundamentally, the power switch 6 is depressed and the input select button 12a is then depressed to select the composite video signal or the R, G and B video signals. Then, the lighting condition of the auto-scan LED 13f in the mode indicator group 13 is confirmed. If the auto-scan LED 13f is in its OFF state, the auto-scan button 12d is depressed, and the multi-picture button 12b is depressed thereby to determine whether video image is printed in the single picture mode or in the multi-picture mode. If the printing in the single picture mode is selected, a proper video image is printed out on the printing paper by depressing the print button 8a. If the printing in the multi-picture mode is selected, then data is stored in the memory by depression of the print button 8a. Further, if the copy button 8b is depressed, a proper multi-picture on which, for example, four video images are printed on a single recording paper is printed out.

A circuit arrangement within this multi-scan video printer will be described with reference to FIG. 2.

Figure 2:
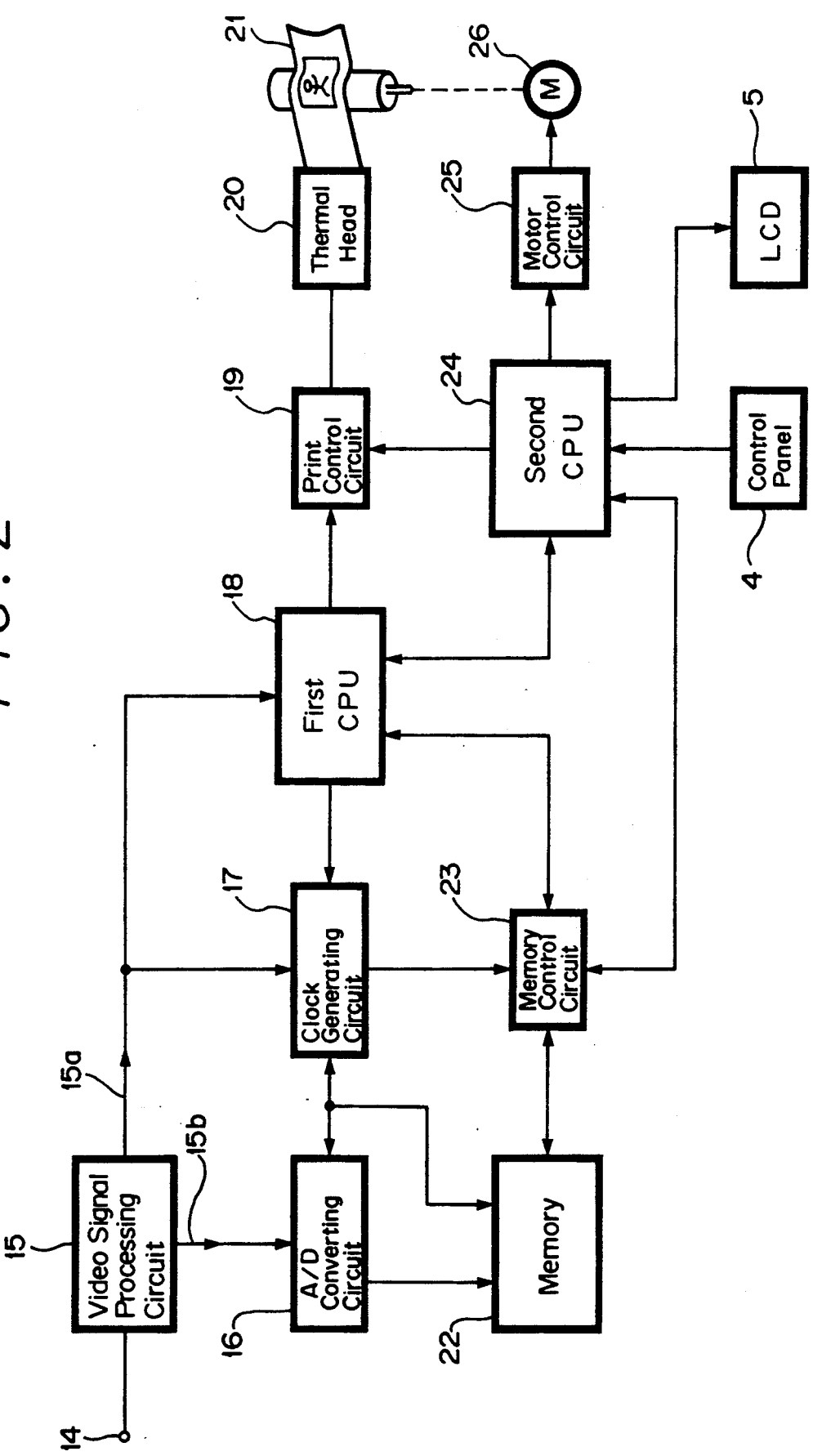
FIG. 2 is a block diagram showing an embodiment of the printer for printing video image according to the present invention.

Referring to FIG. 2, an input terminal 14 is supplied with signals such as NTSC composite video signal or R, G and B video signals and so on having different horizontal scanning frequencies and different horizontal scanning lines. The selected video signal is supplied through the input terminal 14 to a video signal processing circuit 15, and the video signal processing circuit 15 processes the signal, for example, the composite video signal applied to the input terminal 14 in various signal processing manners and also separates the composite video signal to provide a video signal 15b and a synchronizing (i.e. sync.) signal 15a. The synchronizing signal 15a is supplied to a clock generating circuit 17 and a first central processing unit (CPU) 18. The video signal 15b separated by the video signal processing circuit 15 is supplied to an analog-to-digital (A/D) converter 16, in which it is converted to a digital signal. This digital signal is stored in a memory 22.

The clock generating circuit 17 is formed of a phase locked loop (PLL) circuit, and the first CPU 18 responds to the synchronizing signal 15a of the video signal processing circuit 15 to measure the number of scanning lines, the horizontal scanning frequency and so on of the input video signal and sets a sampling frequency in the clock generating circuit 17 on the basis of the measured results. Thus, the clock generating circuit 17 derives a sampling clock synchronized with a horizontal synchronizing signal (i.e. H sync.). At the timing of the sampling clock, the A/D converter 16 performs the sampling of the video signal 15b and the video signal 15b is written in the memory 22. The input video signal written in the memory 22 is supplied through a memory control circuit 23 to the first CPU 18, and the first CPU 18 reads out data of the video signal 15b stored in the memory 22 and supplies the read-out data to a printing control circuit 19. The printing control circuit 19 controls a thermal print head 20 so that printing data to be printed on a printing paper 21 is expanded. The thus expanded data is transferred from the printing control circuit 19 to the thermal print head 20.

A second CPU 24 is connected to the first CPU 18 via a data bus and this second CPU 24 is operated as a host computer. More specifically, the second CPU 24 controls the memory control circuit 23, the printing control circuit 19, a motor control circuit 25 or the like so that various items are displayed on the LCD 5 and that control panel 4 derives signals corresponding to various operations. In particular, the second CPU 24 controls the driving speed of a motor 26 for moving a printing paper so that the aspect ratio becomes predetermined one.

An operation of the multi-scan video printer of this embodiment will be described with reference to FIGS. 5 to 12.

In this embodiment, for the input video signals having different scanning lines and horizontal scanning frequencies applied to the input terminal 14, the number of pieces of video images to be stored in the memory 22 is calculated and displayed, thereby printing a video image under the condition such that the printing size is automatically kept substantially constant.

Figure 5B:
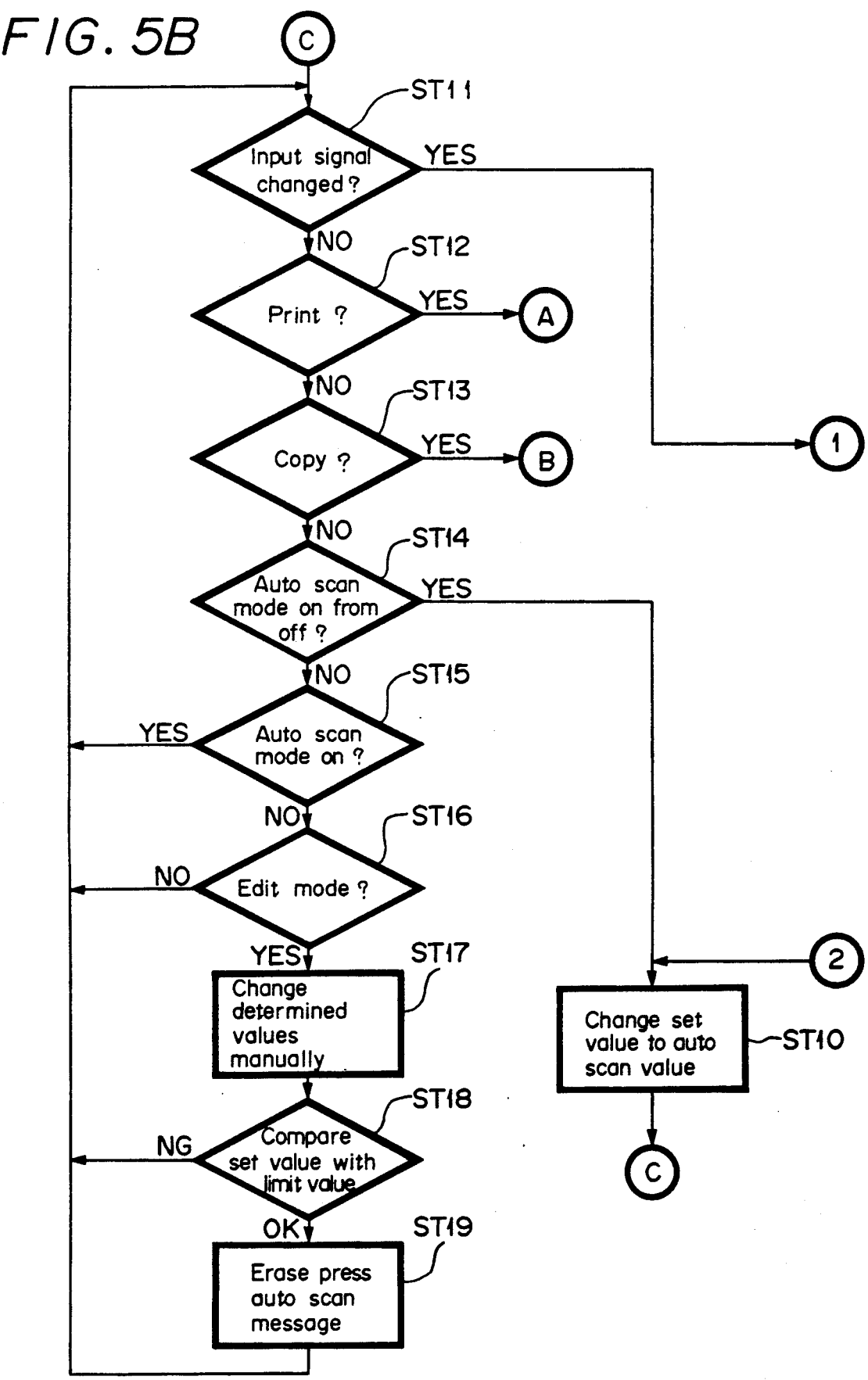
FIG. 5 (formed of FIGS. 5A and 5B drawn on two sheets of drawings to permit the use of a suitably large scale) is a flow chart to which reference will be made in explaining an operation of the printer according to this invention.

As shown in a flow chart forming FIG. 5, following the Start of operation, the routine begins with first step ST1, the power source is turned ON by the depression of the power switch 6 shown in FIG. 3. In second step ST2, the second CPU 24 determines the finally-set value as a set value and determines in decision step ST3 whether or not the video signal is inputted. If no video signal is inputted as represented by a NO in step ST3, then the routine proceeds to step ST4. In step ST4, no input condition is displayed on the LCD 5 and the routine proceeds to Ⓒ which will be described later. If a video signal is inputted as represented by a YES at step ST3, the routine proceeds to step ST5 in which an aspect ratio is selected by a manual operation. Since the aspect ratio is displayed on the LCD 5 in the order of 1 : 1, 4 : 3 and 16 : 9 by the depression of the picture mode button 9b, one of these aspect ratios is pointed out by the cursor button 11 and a proper aspect ratio is selected. After the aspect ratio is selected as described above, the processing of the second CPU 24 enters sixth step ST6 wherein the auto-scan value is calculated. In this step ST6, the auto-scan value is calculated in accordance with a flow chart of FIG. 6.

Figure 6:
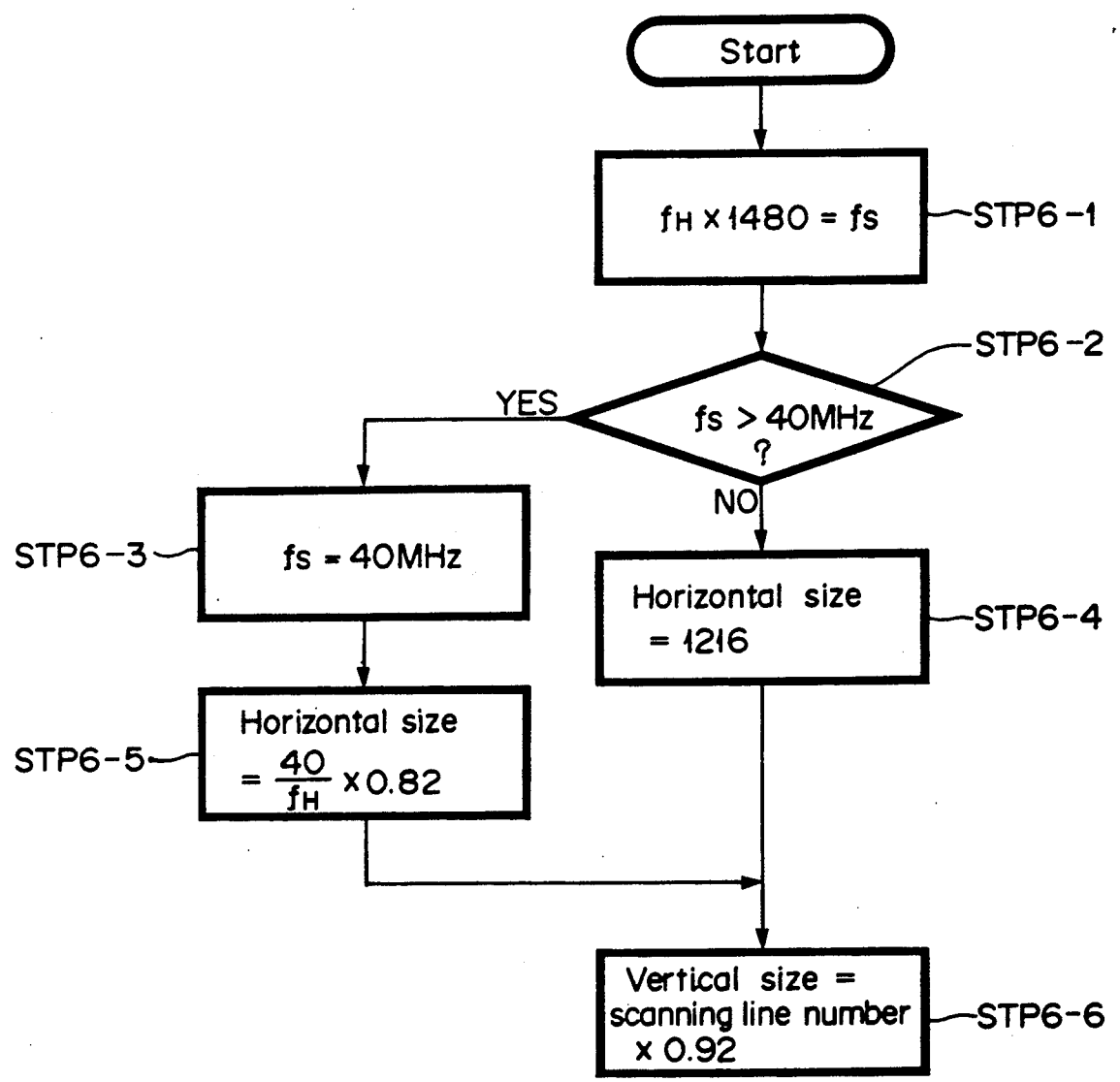
FIG. 6 is a flow chart to which reference will be made in explaining a method for calculating an auto scan value.
Figure 7:
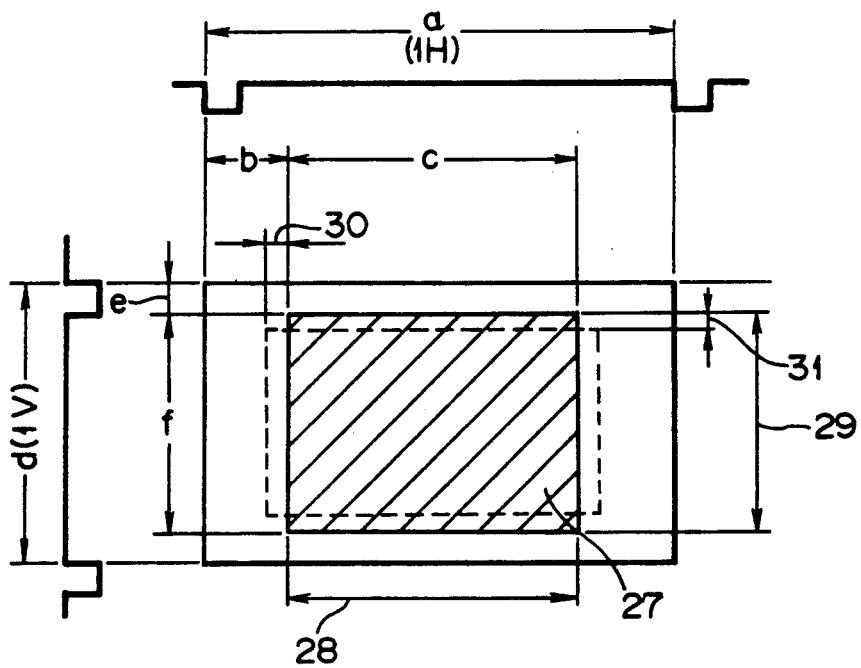
FIG. 7 is a schematic diagram used to explain the way of how to determine the printing area.

Referring to FIG. 6, following the Start of operation, the routine begins with step STP6-1 in which the second CPU 24 receives a horizontal scanning frequency (this frequency will be referred to hereinafter as an fH) of the input video signal calculated by the first CPU 18 and calculates a value which results from multiplying fH by 1482 thereby to calculate the sampling clock frequency fs. The value 1482 is calculated from the number of elements of the thermal print head 20 in the horizontal direction which determines a horizontal size 28 of a printing area 27 at its portion represented by reference letter c except a portion represented by reference letter b from which at least a horizontal synchronizing signal is removed as shown in FIG. 7. The number of elements of the standard thermal print head 20 in the horizontal direction is about 1280 dots. In that case, the number of effective dots assumes 1216 dots and the lateral effective ratio of this value assumes 0.82. Then, an equality of 1216/1482=0.82 is established and therefore the value of 1482 is obtained.

If the sampling clock frequency fs is obtained as described above, the routine proceeds to step STP6-2 in FIG. 6. In step STP6-2, the second CPU 24 determines whether or not the sampling frequency fs is higher than 40 MHz. 40 MHz is determined by a limit value of a drive frequency that drives the A/D converter 16 and the memory 22 shown in FIG. 2. If the sampling frequency fs is lower than 40 MHz as represented by a NO at step STP6-2, then the routine proceeds to step STP6-4 wherein the horizontal size 28 is determined as 1216. If on the other hand the sampling frequency fs is judged by the second CPU 24 to be higher than 40 MHz as represented by a YES at step STP6-2, the routine proceeds to step STP6-3, in which the sampling frequency fs is determined as 40 MHz. Then, the routine proceeds to step STP6-5 in which the horizontal size 28 is calculated. In step STP6-5, the calculation of horizontal size =40 MHz/fH=0.82 is performed, or the value of 82 % of the number of dots within one horizontal line is calculated. In this fashion, the horizontal size 28 is calculated in correspondence with the input video signal.

In the next step STP6-6, a vertical size is calculated. A vertical size 29 in the vertical direction is such that, as shown in FIG. 7, of the line number d of the present scanning lines (1V) measured by the first CPU 18 and excepting e line, the line number of scanning lines for printing in f line period is multiplied with an optimum value of longitudinal effective ratio, for example, 0.92.

Figure 8:
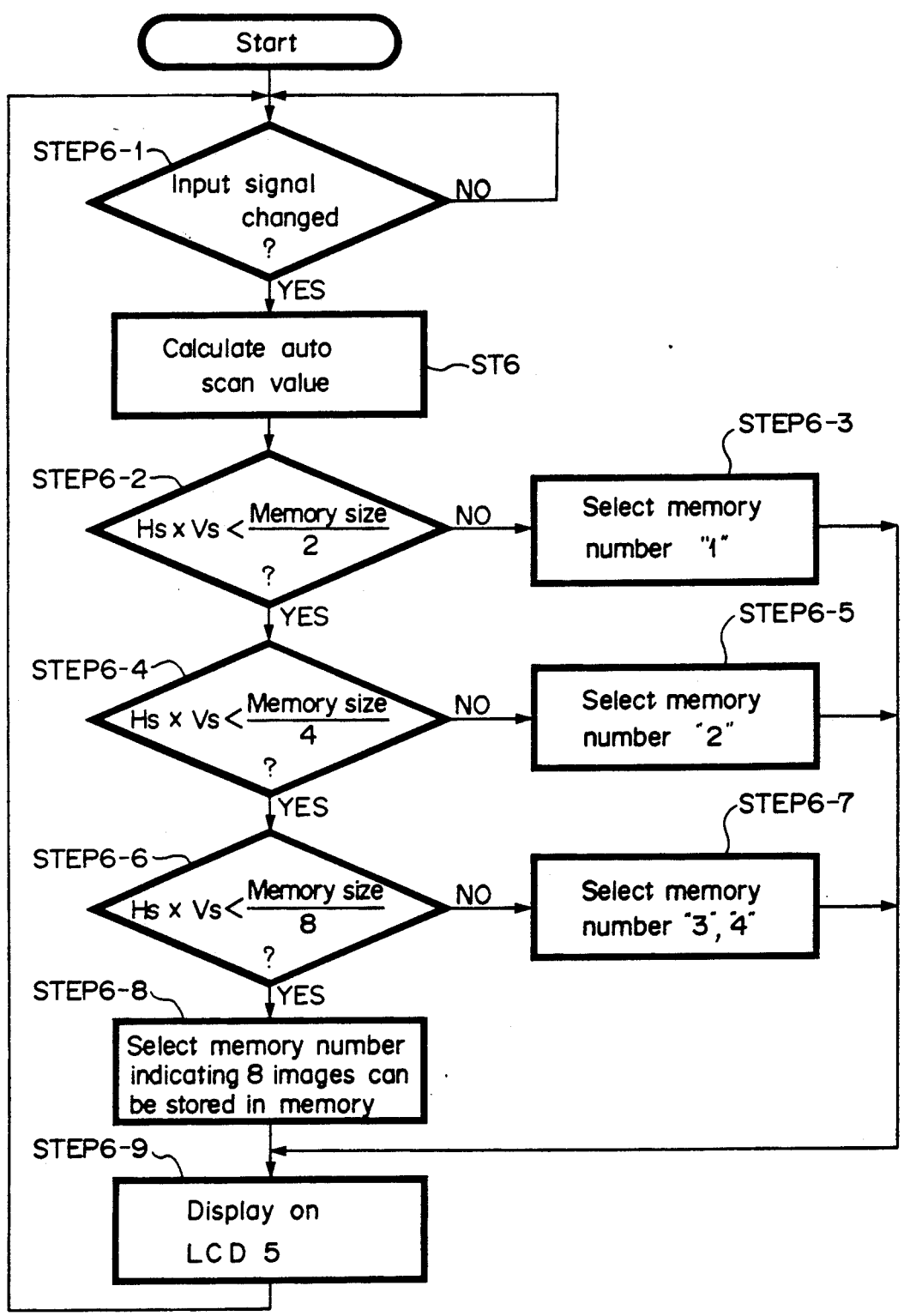
FIG. 8 is a flow chart to which reference will be made in explaining an operation in which the number of pictures stored in the memory is calculated.

After the calculation of the auto scan value at step ST6 shown in FIG. 5 is ended, the second CPU 24 calculates and compares the number of memories that can be stored in the memory 22 as shown in FIG. 8. The calculation of the auto scan value at step ST6 shown in FIG. 5 is carried out only when the input video signal to be stored in the memory 22 is changed as shown at step STEP6-1 of FIG. 8. If the calculation of the vertical size 29 is finished at step ST6 of FIG. 5, or at step STEP6-6 in FIG. 8, then the horizontal size and the vertical size, i.e. the storage capacity of the memory 22 and which is required by one video image is calculated from the number of dots in the horizontal direction x the number of dots in the vertical direction.

More specifically, in FIG. 8 at decision step STEP6-2, it is determined whether or not the horizontal size x vertical size (will be referred to hereinafter as Hs×Vs) is smaller than ½ of the storage capacity of the memory 22, i.e. size (in actual practice, storage capacity of about 2 Megabytes). If a NO is output at step STEP6-2, the routine proceeds to step STEP6-3 in which a memory number 1 for indicating that the number of video images stored in the memory 22 is one is selected. If on the other hand a YES is output at step STEP6-2, then the routine proceeds to the next decision step STEP6-4. It is determined in decision step STEP6-4 whether or not Hs×Vs is smaller than ¼ of the size of the memory 22. If a NO is output at step STEP6-4, the routine proceeds to step STEP6-5 whereat a memory number 2 for indicating that the number of video images stored in the memory 22 is two is selected. If a YES is output at step STEP6-4, the routine proceeds to the next decision step STEP6-6 wherein it is determined whether or not Hs×Vs is smaller than ⅛ of the size of the memory 22. If a NO is output at step STEP6-6, the routine proceeds to step STEP6-7 wherein the memory numbers "3" and "4" in which the number of pictures stored in the memory 22 are 3 and 4 are selected. If a YES is output at step STEP6-6, then the routine proceeds to step STEP6-8 wherein a memory number indicating that 8 video images can be stored in the memory 22 is selected. The processing at step STEP6-8 corresponds to the case in which one picture screen is equally divided by 4 in the multi-picture mode. At the completion of steps STEP6-3, STEP6-5, STEP6-7 and STEP6-8, the routine proceeds to step STEP6-9 whereat the number of video images that can be stored in the memory, i.e. memory number is displayed on the LCD 5. After the memory number is displayed on the LCD 5, the routine returns to step STEP6-1 in which it is determined by the second CPU 24 whether or not the input video signal is changed. If a YES is output at step STEP6-1, the auto scan value is calculated in step ST6 one more time. If on the other hand a NO is output at step STEP6-1, the routine returns to step STEP6-1. After the aforementioned display operation is ended, the routine proceeds to step ST7 shown in FIG. 5.

FIG. 10 shows one of the methods for displaying the number of memories of the video signal that can be stored in the memory in FIG. 8 on the LCD 5. If the printer is set in the auto scan mode, it is automatically determined by the input video signal input to the multi-scan video printer whether or not the calculation and the comparison should be performed in accordance with the flow chart shown in FIG. 8. In order to gain a better understanding of this operation, the single picture mode, for example, will be described. If an input video signal according to the so-called high definition television system having 1125 scanning lines is stored in the memory 22, READY$\boxed{1}$ is displayed on the LCD 5 as represented by reference numeral 33 in FIG. 10. This display indicates that, as shown on the right column of FIG. 10, one video image can be stored in the memory 22 and in the memory number 1. If an NTSC video input signal 525 scanning lines is stored in the memory 22, READY$\boxed{2}$ is displayed on the LCD 5 as shown by reference numeral 34 in FIG. 10. This display indicates that two video images can be stored in the memory 22. If an NTSC non-interlaced scanning system video input signal is input to the multi-scan video printer, READY$\boxed{2}^{3}$ is displayed on the LCD 5 as shown by reference numeral 35 in FIG. 10. This display indicates that three and four video images, that is, four video images in total can be stored in the memory 22 hidden in the arrow direction. The memory numbers 1, 2 and so on marked by a pointer 36 indicate memory numbers that are printed out when the print button 8a is depressed. If the skip button 8e shown in FIG. 4 is depressed, READY$\boxed{4}^{9}$ is displayed on the LCD 5 as shown by reference numeral 35 in FIG. 10, which indicates the condition such that data stored in the divided area represented by memory number 3 can be printed out. Further, if the skip button 8e is depressed, READY$\boxed{3}^{3}$ is displayed on the LCD 5, which indicates that data stored in divided area shown by the memory number 4 can be printed out. If the skip button 8e is further depressed under such displayed condition, then the displayed condition on the LCD 5 is changed as represented by reference numeral 34 in FIG. 10. The displayed condition on a middle column 37 in FIG. 10 represents one example of the displaying methods according to the multi-picture mode.

The pointer 36 may be provided in the memory in which a video input signal is to be stored and in the memory whose data is to be printed out. Further, when four memories 1, 2, 3 and 4 are effective as shown in the display 35 of FIG. 10, four video input signals are stored in the memory and converted to video input signals having many scanning lines so that only two video images can be stored in the memory 22. If the display of the number of video images stored in the effective memory are respectively performed with respect to the printing operation for four video images and two video images stored in the memory, that is, when the number of latest video images stored in the memory and the number of video image of new signal are different or if the number of latest video images stored in the memory and the number of video image of new signal are independently displayed, the display of the number of video images within the effective memory can be understood more fully.

If the calculation of auto scan value in step ST6 shown in FIG. 5 is ended, it is determined by the second CPU 24 in decision step ST7 whether or not the multi-scan video printer is set in the auto scan mode. If the multi-scan video printer is not in the auto scan mode as represented by a NO at step ST7, then the routine proceeds to the next decision step ST8. In step ST8, the auto scan button 12d is made OFF. In that case, if the sampling frequency of the input video signal is very high, it is frequently observed that the number of scanning lines exceeds limit value of a driving frequency of the multi-scan video printer. If the number of scanning lines is less than the set value or the like, even when the auto scan button 12d is turned OFF, a video image to be printed is not definite and has no meaning. For this reason, in decision step ST8, the present set value is compared with a limit of a value set by the input video signal. If "NG" state is determined in step ST8, the routine proceeds to step ST9 in which a command for depressing the auto scan button 12d is issued and displayed on the LCD 5. When step ST9 is ended and "OK" condition is presented at step ST8, the routine proceeds to ⓒ. Further, if the multi-scan video printer is set in the auto scan mode as represented by a YES at step ST7, the routine proceeds to step ST10. In step ST10, the auto scan value is changed to the auto scan value calculated at step ST6. In other words, the auto scan value is rewritten as a value to be stored in the memory 22. At the completion of the step ST10, the routine proceeds to step ⓒ. ⓒ is indicated on the upper left of FIG. 5 and the routine proceeds from to the next decision step ST11. It is determined in step ST11 whether or not the input video signal is changed. If the input video signal is changed as represented by a YES at step ST11, the routine returns to step ST3 and then the auto scan value is calculated once again. If on the other hand the input video signal is not changed as represented by a NO at step ST11, the routine proceeds to the next decision step ST12 wherein it is determined by the second CPU 24 whether or not the print button 8a is depressed. When the print button 8a is depressed, the memory-in operation of the printing set value and the printing operation are carried out. If the print button 8a is depressed as represented by a YES at step ST12, the routine proceeds to Ⓐ which will be described later. If the print button 8a is not depressed as represented by a NO at step ST12, then the routine proceeds to step ST13. In step ST13, it is similarly determined by the second CPU 24 whether or not the copy button 8b is depressed. If a YES is output at step ST13, the routine proceeds to Ⓑ which will be described later. If a NO is output at step ST13, the routine proceeds to the next decision step ST14.

If a YES is output at step ST12, then the routine proceeds from A of the flow chart shown in the right upper portion of FIG. 5 to step ST20. It is determined by the second CPU 24 in step ST20 whether or not an error exists. If the error exists as represented by a YES at step ST20, the routine returns to Ⓒ because the existence of error means that no-input state is displayed on the LCD 5 as in step ST4 and that the command for depressing the auto scan button 13f is displayed on the LCD 5. If no error exists as represented by a NO at step ST20, the routine proceeds to step ST21 at which the printing set value is changed. In the next step ST22, printing data is stored in the memory 22 and the paper of moving pitch is calculated at the next step ST23. This moving pitch is calculated as follows:

$$\frac{\text{Length of thermal print head}}{\text{Number of dots of thermal print head in the horizontal direction}} \times \text{Number of effective dots} \times$$

$$\frac{1}{\text{Number of effective scanning lines}} \times \text{Aspect ratio}$$

The moving pitch is calculated as described above and the printing is performed at step ST24. If the copy button 8b is depressed, the routine proceeds through Ⓑ to step ST23. In step ST23, the moving pitch is calculated on the basis of the preceding video image data stored in the printing set value memory, and the printing is carried out.

Figure 1A:
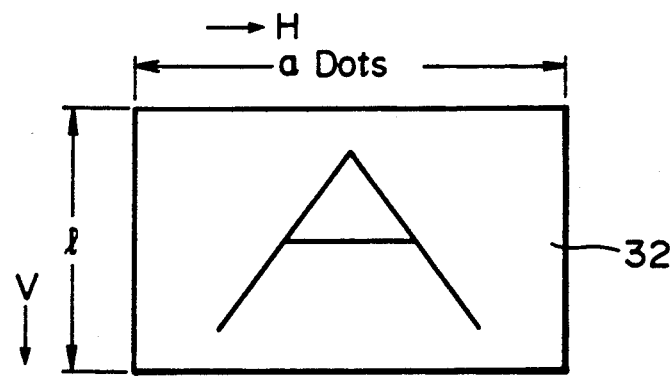
FIGS. 1A–1C are schematic diagrams used in understanding a conventional printing method, respectively.
Figure 1B:
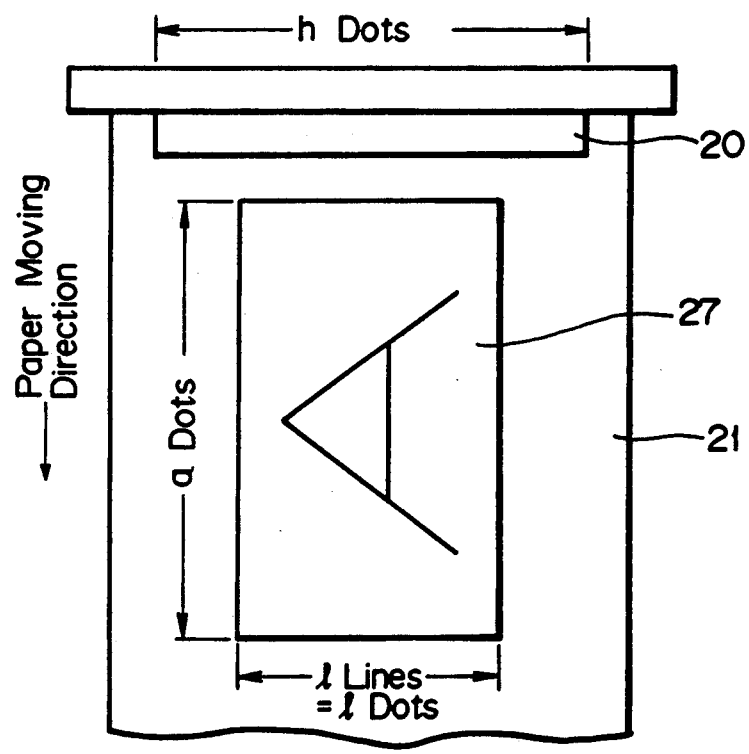
Figure 1C:
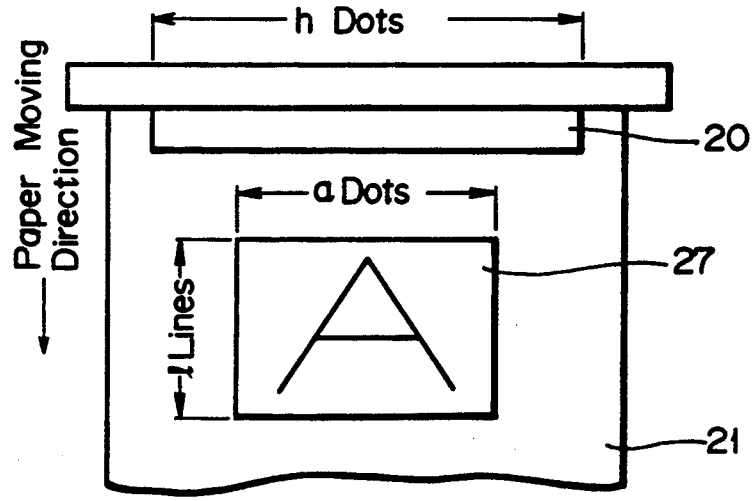

In the calculation of the moving pitch, when the number of effective dots, i.e. the horizontal size is 1216 dots as is described in step STP6-4 of the flow chart of FIG. 6, if the printing is carried out under the condition that one data of the memory corresponds to each of the elements of the thermal print head 20, a printed video image of, for example, 1216 dots wide can be obtained. However, if the printing is carried out under the condition that one data stored in the memory 22 is made corresponding to one element of the thermal print head 20 with respect to the input video signal input in steps STP6-3 and STP6-5, the printed area 27 is reduced (or enlarged) in scale as is described with reference to FIGS. 1A-1C. Accordingly, the second CPU 24 executes the processing along the flow chart of FIG. 9 such that the width of the printing area falls within a constant width of dot numbers within 1216 dots of the effective dot number of the thermal print head 20 regardless of the video signal input to the multi-scan video printer.

Figure 9:
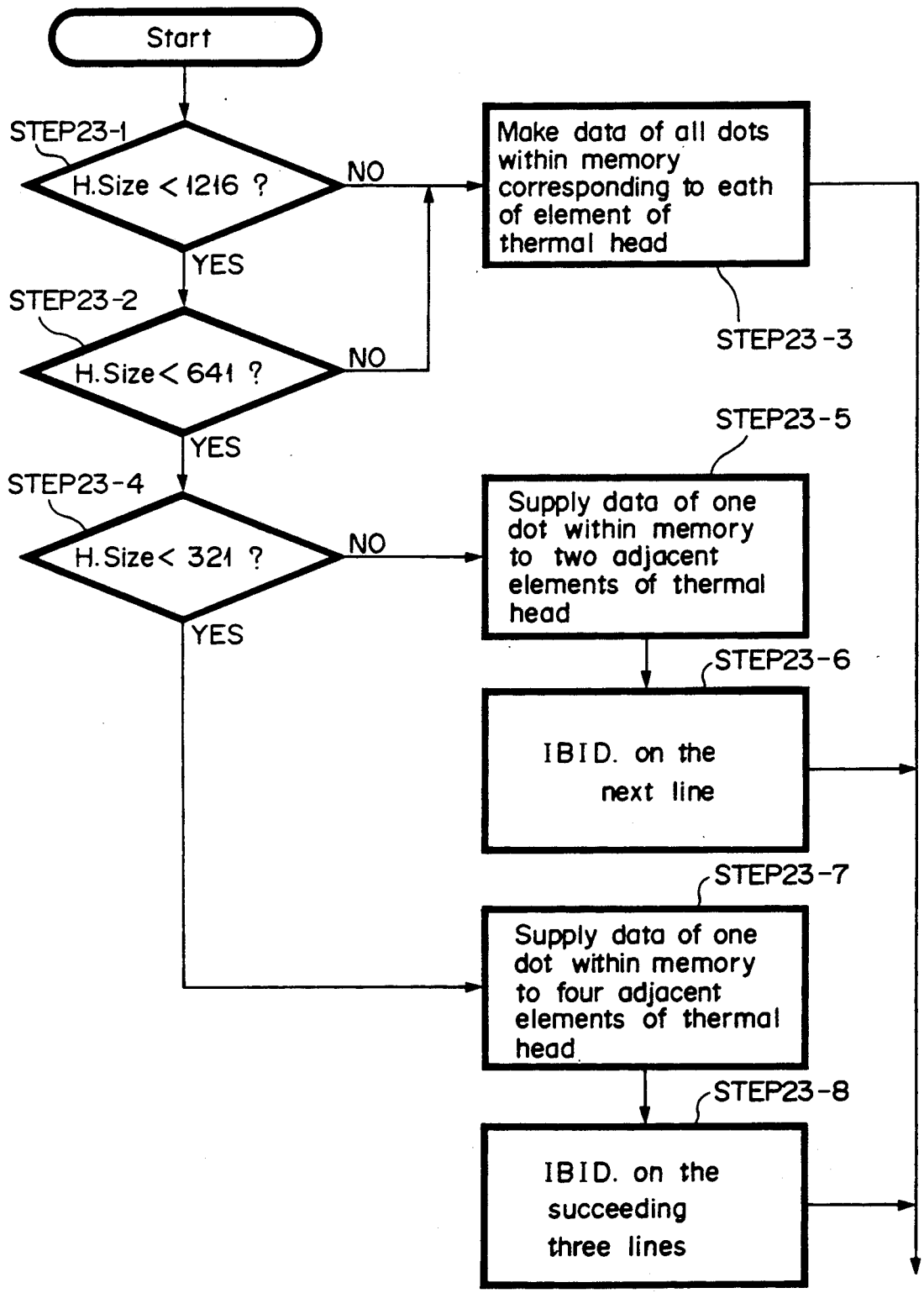
FIG. 9 is a flow chart to which reference will be made in explaining a calculation of a printing paper moving pitch.

More specifically, the flow chart of FIG. 9 shows an example of how to calculate the moving pitch of the horizontal direction within the step ST23 shown in FIG. 5. Referring to FIG. 9, following the Start of operation, it is determined in step STEP 23-1 whether or not the horizontal size is smaller than the effective dot number width of the thermal print head 20, that is, the horizontal size is smaller than horizontal size = 1280. If a YES is output at step STEP23-1, the routine proceeds to the next decision step STEP23-2. It is determined in step STEP23-2 whether or not the horizontal size is smaller than 641 which results from adding 1 to 640 which is half of the dot number, 1280 of the full width of the thermal print head 20. If a NO is output at steps STEP23-1 and STEP23-2, then the routine proceeds to step STEP23-3. In step STEP23-3, the data of the video signal of the input video signal stored in the memory 22 is read out and supplied through the memory control circuit 23 to the first CPU 18. The first CPU 18 supplies the second CPU 24 with data based on the measuring of the horizontal scanning frequency and scanning line number of the video signal by way of the data bus so that the number of pixels of one line of the video signal generated in response to one line of the thermal print head 20 is detected. The number of pixels and the number of printing elements are compared with each other similarly to steps STEP23-1 and STEP23-2. The compared output data is supplied to the first CPU 18 from the second CPU 24 through the data bus. The first CPU 18 places the printing control circuit 19 in the mode such that data of all dots read out from the memory 22 are assigned one by one to the respective elements of 1216 dots of the thermal print head 20. In other words, the first CPU 18 issues the command to the printing control circuit 19 so that one data within the memory is allocated to each element of the thermal print head 20 in the line direction. Under the control of the second CPU 24, the printing control circuit 19 controls the thermal print head 20 so that the thermal print head 20 strikes one element per data. If it is determined at decision step STEP23-2 that the horizontal size is smaller than 641 or a YES is output, the routine proceeds to the next decision step STEP23-4. It is determined in step STEP23-4 by the second CPU 24 whether or not the horizontal size is smaller than 321 which results from adding 1 to 320 which is half of the horizontal size, 640. If a NO is output at step STEP23-4, then the routine proceeds to step STEP23-5. In step STEP23-5, the second CPU 24 determines that one dot of video signal data stored in the memory 22 is supplied to adjacent two elements of the thermal print head 20 in the first line. Resultant control data is supplied to the first CPU 18, and the first CPU 18 supplies this control data to the print control circuit 19. A similar command in which one of video signal data is supplied to adjacent two elements is issued to the line of the next vertical direction as is described at step STEP23-6. If it is determined at step STEP23-4 that the horizontal size is smaller than 321 or a YES is output, the routine proceeds to step STEP23-7. In step STEP23-7, it is determined by the second CPU 24 that one dot of video signal data stored in the memory 22 is supplied to adjacent four elements of the thermal print head 20 in the first line. Resultant control data is supplied to the first CPU 18 and the first CPU 18 supplies this control data to the printing control circuit 19. The similar command in which one dot of video signal data is supplied to adjacent four elements of the thermal print head 20 on the first line is issued up to three lines as shown by STEP 23-8. At the completion of steps STEP23-3, STEP23-6 and STEP23-8, the routine proceeds to printing step ST24 shown in FIG. 5.

After the enlargement of the thermal print head 20 in its line direction is carried out in response to the incoming video signal, the vertical size of the vertical direction is determined when the second CPU 24 controls the moving pitch of the printing paper 21 through the motor control circuit 25 in response to the aspect ratio of the incoming video signal. According to the above-mentioned technique, the video image of substantially constant size can be obtained regardless of the kinds of input video signal.

While the number of elements of the input video image data in the line direction is smaller than the number of elements of thermal print head 20 as described above, if the number of the elements of the input video image data in the line direction is larger than the number of the elements of the thermal print head 20, the printed size can be reduced in size by constant width within the number of elements of the thermal print head 20. In that case, proper video image data is selected and other video image data is thrown away.

To generalize the above-described case, the printing is carried out by using the same data of n dots so as to establish c = h/n (n is an integer larger than 2) when c assumes the horizontal size of the line direction to be printed and h assumes the number of dots of the thermal print head 20 in the line direction (see FIG. 7). In general, if the digital operation processing is carried out so as to provide h data based on c data, the constant printing size can be obtained regardless of the kinds of video input signals.

Figure 11:
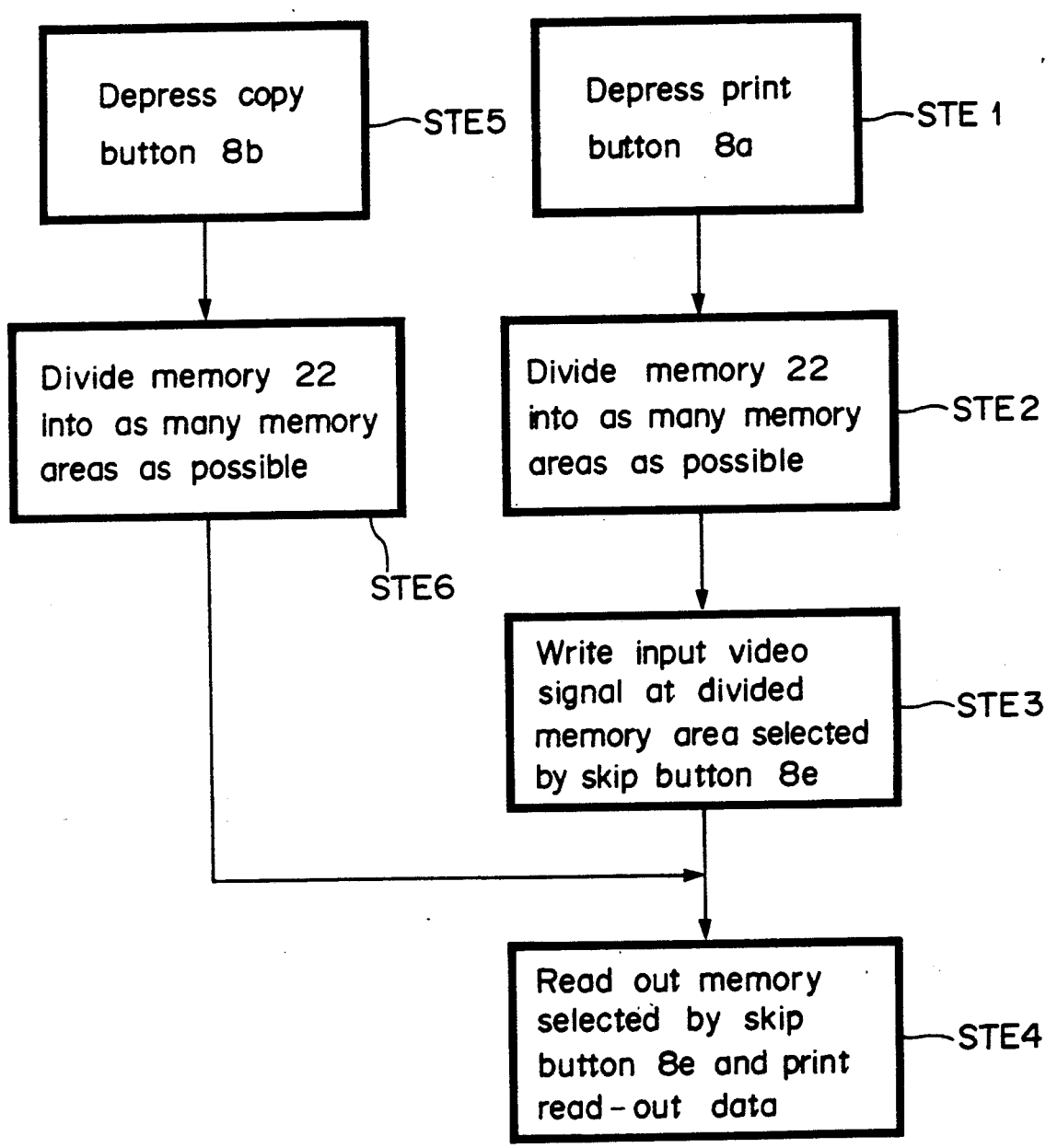
FIG. 11 is a flow chart to which reference will be made in explaining an operation of the printing mode.

A flow chart of operations wherein the print button 8a and the copy button 8b are depressed at steps ST12 and ST13 of FIG. 5 is represented in FIG. 11.

Referring to FIG. 11, if the print button 8a is depressed at step STE1, the routine proceeds to the next step STE2 wherein the second CPU 24 divides the memory 22 to provide as many memory areas as possible in response to the input video signal. In the next step STE3, the input video signal is written in the memory at its divided area selected by the skip button 8e, and in the next step STE4, the memory in the divided area selected by the skip button 8e is read-out and the printing is carried out. In step STE5 where the copy button 8b is depressed, the memory is divided to provide as many memory areas as possible in step STE6 similarly to step STE2. Then, the routine proceeds to step STE4 wherein data stored in the memory when the print button 8a is depressed is read-out and the printing is carried out.

The step ST14 shown on the left of FIG. 5 will be explained. Referring back to FIG. 5, it is determined in step ST14 whether or not the auto scan mode is turned ON from its OFF state. If the auto scan mode is turned ON from its OFF state as represented by a YES at step ST14, the routine proceeds to step ST10 wherein the determined value is changed to the auto scan value. If a NO is output at step ST14, the routine proceeds to the next decision step ST15. It is determined in step ST15 whether or not the auto scan mode is in its ON state. If a YES is output at step ST15, the routine then returns to step ST11. If a NO is output at step ST15, then the routine proceeds to the next decision step ST16. In step ST16, it is determined whether or not the determined mode is the edit mode. In that case, value of data to be printed can be determined by the manual operation. If a NO is output at step ST16, the routine returns to step ST11, while a YES is output at step ST16, then the routine proceeds to step ST17 wherein the determined values are changed in a manual fashion.

This condition will be explained with reference to FIGS. 7 and 12. In this edit mode, the operation buttons for manual operation are the format button 9c, the picture mode button 9b and the scan adjust button 9a. Of these buttons 9c, 9b and 9a, the format button 9c is used to determine post-feed, page size, caption, board rate, parity and so on. The picture mode button 9b is used to determine contrast, brightness, the aforementioned aspect ratio, high-, middle- and low-filters, negative condition, positive condition or the like. These items are not directly related to this embodiment and therefore need not be described in detail.

Figure 12:
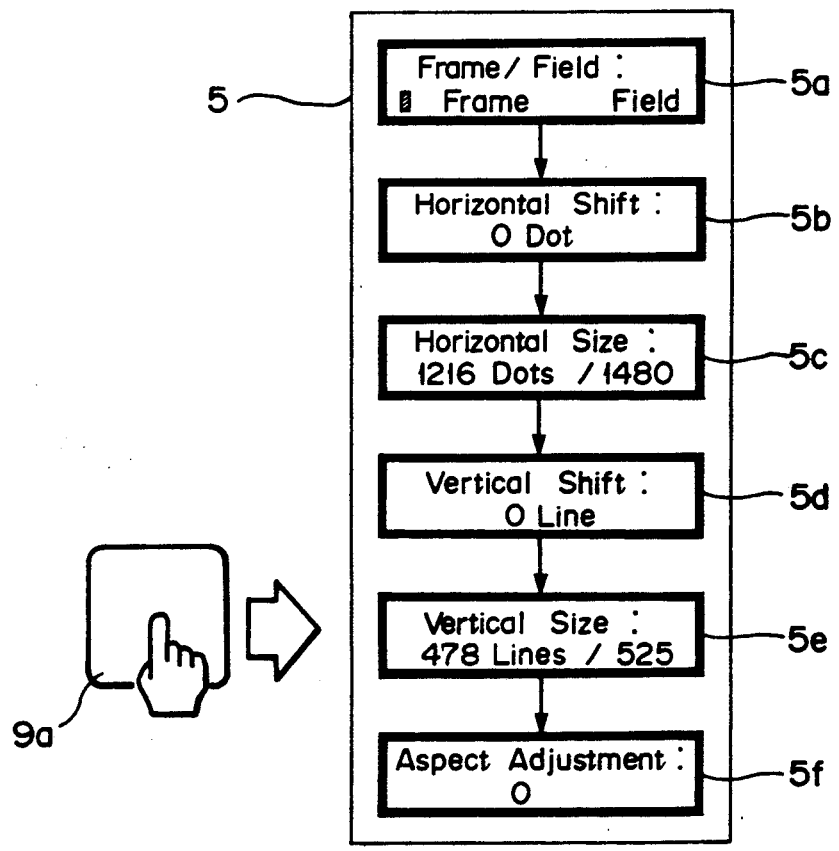
FIG. 12 is a schematic diagram used in understanding operation functions of a scan adjust button.

If the scan adjust button 9a is depressed, various items are displayed on the LCD 5 as shown in FIG. 12. A display 5a indicates that, when the frame or field input video signal is selected by the cursor button 11, the frame or field signal is inputted to a print-out memory. A display 5b indicates the amount of the horizontal shift in the unit of dots and is used to adjust the horizontal shift amount 30 of FIG. 7. 0 dot indicates the position in which the printing area is not shifted in the horizontal direction from the auto scan mode position. More specifically, when the auto scan mode position is employed as a standard, i.e. 0 dot and the printing area is shifted, for example, to the left by 20 dots, if a ◁ button in the cursor button 11 is continuously depressed until [to the left by 20 dots] is displayed, the dashed line block in FIG. 7 is horizontally shifted to the left by 20 dots relative to the printing area 27. The next display 5c is used to determine the horizontal size 28 in the unit of dots in a manual fashion. The length of the horizontal direction, that is, the horizontal size is presented as C=1216 dot similarly as calculated hereinbefore, and the length of, for example, the full horizontal direction is presented as a (1H)=1482 dots. A display 5d is used to adjust the vertical shift amount 31 in the unit of lines and 0 line indicates the position at which the printing area is not shifted in the vertical direction from the auto scan mode position. More specifically, when the auto scan mode is taken as a standard, that is, 0 line and the printing areas is shifted, for example, to the lower direction by 10 lines, if a ◁ button in the cursor button 11 is depressed and this ◁ button is continuously depressed until [to the lower direction by 10 lines] is displayed, the printing area is vertically shifted to the lower direction by 10 lines relative to the printing area 27 as shown by the range of the vertical shift in FIG. 7. The display 5e is used to determine the vertical size 29 in the units of lines wherein while the lines in the measured vertical direction 2d=2V are 525 lines according to the NTSC system, 2f=478 lines is determined excepting at least the blanking portions 2e. A display 5f is used to adjust the aspect ratio. When the aspect ratio is changed, if a ▷ button in the cursor button 11 is depressed, the picture the horizontal direction is enlarged in a manual fashion. Further, if a ◁ button in the cursor button 11 is depressed, the picture in the horizontal direction is reduced in a manual fashion. At the completion of the scan adjust in various items in a manual fashion, the second CPU 24 proceeds to decision step ST18 of FIG. 5. In decision step ST18, the present set value and the limit of the value set by the input video signal are compared with each other similarly to step ST8 because the routine passing step ST9 in which the auto scan button 12c is depressed is passed through steps ST11 to ST17. If a compared output is "NG", the routine returns to step ST11. If the compared output is "OK", then the routine proceeds to step ST19 in which the press auto scan message, i.e. message displayed on the LCD 5 for depressing the auto scan button 12c is erased, and the routine returns to step ST11.

According to the printer of this embodiment, there is provided the auto scan mode in which the optimum printing can be carried out for the video input signals having different number of scanning lines and horizontal frequencies. In the auto scan mode, on the basis of the number of scanning lines and the horizontal scanning frequency of the video input signal that are always measured, the printing areas in the horizontal and vertical directions are determined in accordance with the aspect ratio of the standard video signal. More specifically, in the vertical direction, of the number of scanning lines during the vertical scanning period (1V), the e line is removed as the blanking period and only the f line is printed as shown in FIG. 7. The e and f lines are obtained by multiplying the line number d with a predetermined ratio. Further, the horizontal direction is determined in the unit of dots. When the video image is printed as the printing area in FIG. 7, the horizontal direction is obtained from the number of elements of the thermal print head 20 such that the printed video image may have the optimum picture size. If the optimum size is composed of the elements of g dots, the length c dots of the horizontal size 28 in FIG. 7 become equal to dots. Then, the number of total dots during the 1H period is obtained from a standard ratio between the number of dots and the printing area 27 during one horizontal period (1H), and the sampling frequency fs is calculated from the horizontal scanning frequency and the total number of dots measured by the first CPU 18. In actual practice, the upper limit of the sampling frequency fs is determined as 40 MHz from the restrictions of the A/D converter 16 and the drive frequency of the memory 22 within the printer. Then, the number of dots is counted backward from the maximum operable sampling frequency fs and the printing is carried out thereby to obtain a normal video image.

With respect to the vertical direction, since the printing pitch per line is calculated so that the printing range becomes a certain predetermined aspect ratio, the rotational speed of the printing paper moving motor 26 is controlled and the printing is carried out at this printing pitch. Therefore, even when a plurality of different video input signals are inputted, the printing with the determined aspect ratio can be carried out in the optimum size and in the optimum range.

Further, for video input signal of standard printing ratio which is not optimum for printing, and a dropout of an image will occur upon printing, since the video input signal is not considerably different from the auto scan mode set, the data are controlled by manually operating the scan adjust button and the items fine adjusted are varied by the relative values relative to the auto scan values. Therefore, even when the user has no precise understanding of the specification of the video input signal like the prior art, the respective items can be fine adjusted with ease.

According to this embodiment, the printer is provided with the auto scan mode in which the optimum printing can be carried out for video input signals having different scanning lines and horizontal scanning frequencies. In the auto scan mode, on the basis of the scanning lines and horizontal scanning frequency of the input video signal which are always measured, the printing area of the horizontal and vertical directions are determined in accordance with the ratio of the standard video signal, and also the number of video images which can bs stored in the memory is calculated from the entire storage capacity of the memory in response to a plurality of different video input signal and the maximum number of video images corresponding to the video input signals can be automatically determined. Therefore, the memory can be utilized very effectively within the constant storage capacity. Further, the user can visually confirm the condition of the memory by displaying the number of video images stored in the memory on the LCD. Further, since the pointer is added to the memory number, it is possible for the user to determine whether the video input signal is stored in the memory or the video input signal is printed out.

Further, since the printer of this embodiment is constructed as described above, if the printer is placed in the auto scan mode, even when a plurality of video input signals are different in horizontal scanning frequency and horizontal scanning line, the video image is automatically printed in substantially constant size by using the same data of n bits. Thus, even when the user does not correctly understand the signal specification of the video input signal like the prior art, the printing data can be adjusted with ease.

As described above, according to the prior-art printing apparatus, the user must understand the specification of the video input signal and input various items by the manual operation each time a different video input signal is inputted. However, according to the first feature of the present invention, since the video input signal is always measured and the optimum printing can be carried out on the basis of the information of the video input signal, the video image can be printed automatically in optimum size and in the optimum printing range. Further, the video image displaced a little in the auto scan mode can be adjusted manually with ease.

According to the second feature of the present invention, since the video input signal is always measured and the maximum number of video images which can be stored in the memory is automatically determined on the basis of the information of the video input signal, the memory can be utilized effectively. Further, since the number of video images which can be used for the memory is displayed, the printer of the present invention becomes more useful.

As described above, according to the prior-art printing apparatus, the user must understand the specification of the video input signal and input the printing size by the manual operation each time a different video input signal is inputted. However, according to the third feature of the present invention, since the video input signal is always measured and the optimum printing can be carried out on the basis of the information of the video input signal, the video image can be printed automatically in optimum size and in the optimum printing range. Furthermore, the video image displaced a little in the auto scan mode can be enlarged or reduced manually with ease.

Having described a preferred embodiment of the invention with reference to the accompanying drawings, it is to be understood that the invention is not limited to that precise embodiment and that various changes and modifications could be effected by one skilled in the art without departing from the spirit or scope of the novel concepts of the invention as defined in the appended claims.

We claim as our invention

1. A printer for printing video image comprising: control means including:

means for measuring a horizontal scanning frequency and the number of scanning lines of an input video signal;

means for calculating a sampling frequency of said video signal on the basis of the measured horizontal scanning frequency; and means for calculating a moving pitch of a printing element for printing said video signal on the basis of the number of said scanning lines, wherein a printing range corresponding to said video signal is automatically determined by output signals of said control means.

2. A printer for printing video image comprising: control means including:

means for measuring a horizontal scanning frequency and the number of scanning lines of an input video signal;

means for measuring an amount of information of one picture of said video signal on the basis of the horizontal scanning frequency and the number of scanning lines measured by said means for measuring the number of scanning lines; and means for comparing said information amount with a storage capacity of a memory in which said video signal is stored, wherein the number of pictures which can be stored in said memory is automatically determined on the basis of a compared result of said control means.

3. A printer for printing video image according to claim 2, further comprising display means for displaying thereon the number of pictures which can be stored in said memory.

4. A printer for printing video image comprising:

means for measuring a horizontal scanning frequency and the number of scanning lines of an output video signal;

printing means having a plurality of printing elements for printing said video signal aligned on one line;

means for detecting the number of pixels of one line of said video signal generated in response to one line of said printing element on the basis of said horizontal scanning frequency or the number of said scanning lines;

means for comparing the number of pixels with the number of printing elements; and processing means for processing the number of said pixels so as to be matched with the number of said printing elements on the basis of the compared result of said comparing means.

* * * * *